Patented Feb. 17, 1931

1,793,442

UNITED STATES PATENT OFFICE

GLENN E. HILLIARD, OF BRACKENRIDGE, PENNSYLVANIA

METHOD OF MAKING OPEN-HEARTH STEEL

No Drawing.  Application filed March 26, 1929. Serial No. 350,138.

This invention relates to the manufacture of steel by the open-hearth process, and especially to the melting of pig iron and metal scrap in open-hearth furnaces to produce steel.

More particularly, the invention relates to the method of melting pig iron and metal scrap in open-hearth furnaces, which involves the practice of a so-called pig and scrap process. And more particularly still, the invention relates to a method of melting of pig iron and metal scrap in open-hearth furnaces in the practice of a pig and scrap process wherein the pig iron and scrap used to make up the charge are introduced into the furnace in a solid state.

In the employment of a pig and scrap process in open-hearth furnaces to produce steel, numerous objectionable conditions are always in evidence. Particularly is this true when both the pig iron and the steel scrap are introduced into the furnace in a solid state. In this practice it is invariably the custom to first charge into the furnace the scrap portion, partially melt and soften this material by means of the furnace gases, then charge the pig iron portion thereon and then proceed to bring the whole to a molten condition whereby the whole may be purified as finished steel.

It remains a fact that certain conditions are met in this practice which are exceedingly undesirable from the standpoint of economical working. In the first place, during the period the scrap portion is being partially melted the low carbon scrap is oxidized extensively by the furnace gases, thereby affecting considerably the yield realized on a given tonnage charge.

Further, the efficiency of the furnace is comparatively low from the standpoint of the fuel economy, thereby adversely affecting attempts toward economical working. Further still, the time required to produce a heat of steel by this method is such that production costs are comparatively high. Again, the carbon content of the melted bath, under this method, is frequently of such proportion as to cause much delay and expense in carrying out the refinement of the bath to produce steel.

It is an object of this invention to provide a method of melting pig iron and steel scrap in open-hearth furnaces whereby excessive oxidation of the scrap is prevented.

Another object of this invention is to provide a method of melting pig iron and scrap in open-hearth furnaces whereby a substantial saving in fuel is realized.

Still another object of this invention is to provide a method of melting pig iron and scrap in open-hearth furnaces whereby the time required to produce a finished heat of steel from the furnace is considerably shortened.

And still another object of this invention is to provide a method of melting pig iron and scrap in open-hearth furnaces whereby the condition of an improper carbon content of the melted bath is avoided.

My invention consists in the preparation of a molten bath of pig iron in an open-hearth furnace, introducing a stream of prepared solid scrap in a comparatively finely divided state into this molten bath at such rate that the scrap is almost instantly melted and dissolved as a homogeneous mixture of the liquid bath thereby being enabled to maintain the liquid bath in a substantially constant state of mobility and during this entire period subjecting the bath to the action of a strongly oxidizing furnace flame, without causing excessive oxidation of the scrap, and thus permit of the bath being more quickly purified and steel more economically produced than is possible under ordinary open-hearth methods.

I am aware that attempts have been made to create a molten bath of iron in an open-hearth furnace and then dump solid scrap thereinto, however, these attempts have met with indifferent success due to the fact that any quantity of cold scrap dumped in bulk into the molten bath tended to chill the bath to a degree where the scrap dumping necessarily became an intermittent operation and considerable time was required to again bring the bath to a working heat following each scrap addition. It is well known that when a molten bath of iron is chilled its mobility is destroyed and this acts detrimentally to economical open-hearth furnace working.

Uniformity of fluidity of the bath is destroyed and much fuel must be burned and time consumed to again restore the bath to a necessary degree of fluidity. Again, the open-hearth process is primarily a process of oxidation and only by means of a mobile bath can the furnace gases effect, to any great extent, oxidation of the impurities which are to be removed.

In the practice of my invention, I maintain the bath in a substantially constant state of mobility while the scrap entry and scrap liquefaction is in progress and it then becomes possible to bring about oxidation of the impurities of the bath while such scrap entry is in progress, thereby not only effecting a substantial saving in fuel consumed but also greatly shortening the length of time required to produce a heat of finished steel from the furnace.

Using an open-hearth furnace of the type ordinarily used for steel making I proceed as follows. After covering the hearth bottom with the desired amount of limestone, I charge into the furnace the desired quantity of pig iron and subject this material to the action of the furnace gases until the pig iron has been reduced to a molten state. This melting operation is accomplished very quickly, by reason of the low melting point of the pig iron, and with minimum fuel consumption.

As soon as this charge of pig iron has reached a molten condition, I immediately proceed to introduce the steel scrap directly into this molten bath of iron. I have previously converted the scrap to a physical condition which permits its liquefaction in the bath of iron already in the furnace. Before attempting to introduce this scrap stream I reduce the scrap to a substantially finely divided state. This may be accomplished by crushing, grinding, etc., and since types of mechanical apparatus which may be employed for this purpose are widely known, I claim no invention relative thereto, nor is a description of such apparatus necessary in this application.

Continuing with the description of my invention, I proceed to introduce this prepared finely divided scrap into the molten bath of iron in the furnace in the form of a substantially continuous stream at such rate that the scrap is almost instantly melted and dissolved as a homogeneous mixture of the entire liquid bath. The rate of scrap entry will, of course, be dependent somewhat upon the size of the molten bath first created as well as the fuel supply available to the furnace combustion chamber.

During this period of scrap entry I maintain the bath in a constant state of mobility and pass a strongly oxidizing flame over the bath thereby effecting the oxidation of the impurities of the bath.

For this reason, I prefer to introduce the scrap stream through only a single furnace opening at one time and thus confine the scrap entry to a specific area of the bath, thereby being enabled to more easily maintain the bath in a mobile state. By alternately effecting the introduction of the stream by way of a plurality of openings distributed over the entire hearth area, I am able to take advantage of the intermittent reversals of direction of the flame in its passage over the bath and thus better insure mobility of the bath as well as a maximum utilization of heat generated.

While in the practice of this invention, the scrap stream entry may be effected at a number of points simultaneously with good results, I prefer rather to effect this entry at a plurality of points in sequence somewhat in the manner as described in my co-pending application for Letters Patent, Serial #267,462, filed Apr. 4, 1928, and preferably by way of roof openings in order to secure the advantage of a slight preheating by the furnace gases as the material descends to the bath.

However, excellent results can be obtained in practicing my invention by introducing the scrap stream through openings in the sidewalls of the furnace.

It will be readily seen that by effecting the scrap liquefaction while at the same time maintaining a mobile bath, the bath is in an excellent condition to take up a great portion of the heat from the burning gases passing over it.

The advantages of my invention over other methods whereby scrap is premelted in various types of apparatus and the molten mixture run into the open-hearth furnace for refinement are obvious.

From time to time, during the scrap entry I take a sample from the furnace bath to determine the carbon content of the bath. When the carbon dilution has reached a desired point I discontinue the scrap entry and then proceed to further refine the bath as under ordinary methods. In this way it is comparatively simple to avoid a melted bath having a carbon content too high or too low.

While I have described the practice of my invention as applying to solid pig iron and scrap it is obvious that the merits of the invention also apply equally to the use of molten pig iron and solid scrap. Using molten pig iron, I first pour the molten pig into the furnace and then proceed with the introduction of the scrap stream thereinto as already described.

I claim as my invention:

The method of manufacturing open hearth steel, which comprises attainment in the furnace of a molten bath of carbonized metal, maintaining the bath in a state of mobility, passing a strongly oxidizing flame over the bath to effect oxidation of the impurities thereof, and introducing finely divided scrap at such rate of speed and in such volume that it is heated nearly to molten condition while approaching the surface of the bath but is not excessively oxidized by said flame.

In testimony whereof I, the said GLENN E. HILLIARD have hereunto set my hand.

GLENN E. HILLIARD.